May 6, 1958  R. H. BATTON  2,833,101
ROTARY DISC TYPE ELECTRICALLY DRIVEN LAWN TRIMMER OR EDGER
Filed Aug. 23, 1955
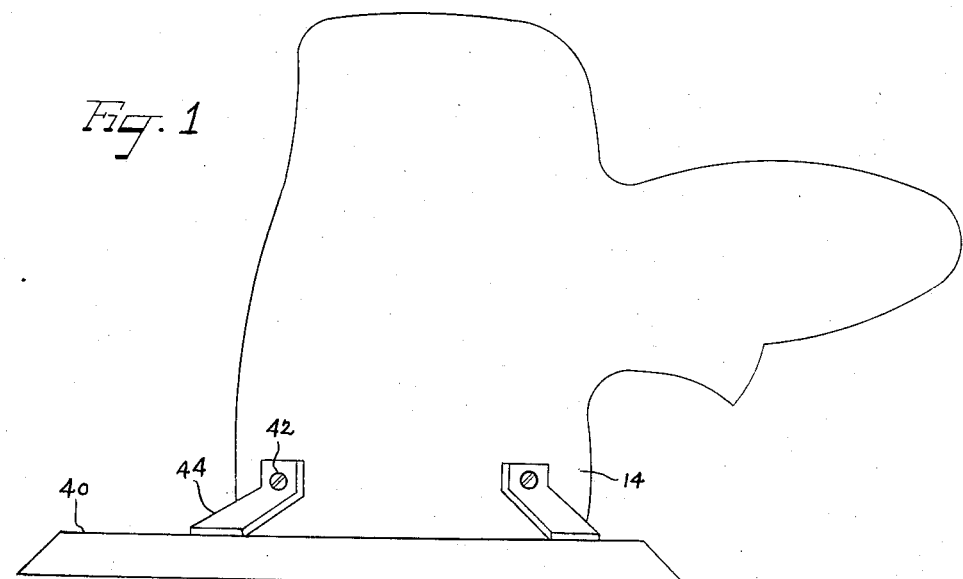
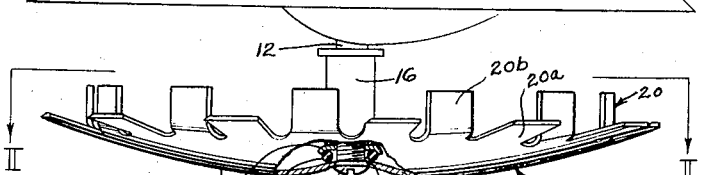
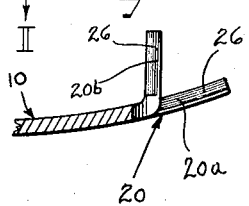
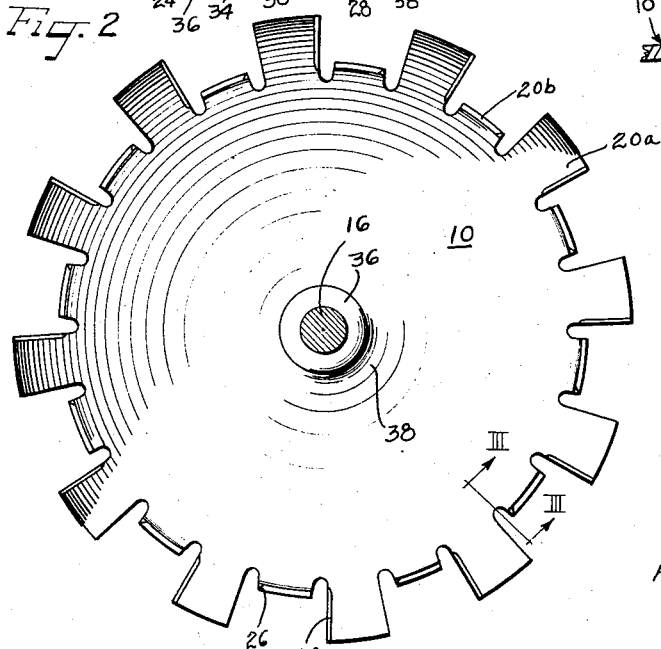
Inventor
RICHARD HARDY BATTON 2,833,101

ROTARY DISC TYPE ELECTRICALLY DRIVEN LAWN TRIMMER OR EDGER

Richard Hardy Batton, Macon, Ga.

Application August 23, 1955, Serial No. 530,015

8 Claims. (Cl. 56—25.4)

My invention relates to a lawn trimmer or edger. It has particular reference to the provisions of a novel cutting blade or tool adapted to be readily attached to a portable electric drill.

It is an object of my invention to provide a lawn trimming device which will be convenient and effective in operation, light in weight, and of simple and economical construction.

Another object of my invention is the provision of such a device which is readily attachable to a conventional electric drill, such as the common, "quarter-inch hole shooter."

A further object of my invention is to provide a cutting tool or plate easily formed from sheet steel.

A further and more particular object of my invention is to provide a lawn trimming device which will prevent "digging in" or gouging of the cutting teeth into the ground, without the use of extra deflectors about those teeth or any shroud extending below the teeth, thereby reducing weight, reducing cost, and increasing the effective cutting swath possible with reference to lawn obstructions such as sidewalks, trees, or the like.

These and other objects, features, and advantages of the present invention will be readily apparent from the following description of a certain preferred embodiment thereof, taken in conjunction with the accompanying drawing, in which:

Figure 1 is a side elevation illustrating my invention according to an embodiment thereof in which a cutting tool is attached to the shaft of a portable electric drill;

Figure 2 is a transverse sectional view of the tool, and taken generally along the line of II—II of Figure 1;

Figure 3 is an enlarged fragmental section through the cutting tool, the section being taken along the line III—III of Figure 2.

As shown in the drawing, a cutting tool or disk such as a plate 10 is held to the revolving shaft 12 of an associated electric drill 14 by an arbor 16. The arbor may be of a type commonly used for attaching grinding wheels, wire buffers, sanders, and the like to electric drills. The electric drill 14 shown is of a portable variety, such as is commonly referred to "quarter-inch hole shooter."

The cutting tool or plate 10 is generally circular, and is desirably provided from sheet steel. A series of cutting teeth 20 extend circumferentially about the plate 10, the teeth 20 being desirably integral extensions of the plate and struck to the desired set. Desirably, the teeth are set at different amounts, a preferred arrangement being that illustrated, in which certain alternate teeth 20a extend generally tangent to the plate while other teeth 20b are set in approximately 90° thereto. Such an arrangement gives a cutting action in two planes.

The central portion 24 of the plate 10 is provided with a dished or cupped configuration to provide a centrally crowned convexity to the surface thereof carried remote from the electric drill 14. The central portion 24 of the plate 10 thereby serves during operation of the device as a convex nose which is adapted to engage the ground and prevent the rotating teeth 20 from "digging in" or gouging the earth.

Desirably, the cutting edges of the teeth are beveled as at 26, or are otherwise provided with a sharp edge.

To adapt the cutting plate 10 for ready attachment to a conventional electric drill, the plate 10 is provided with a central opening 28 desirably countersunk to accommodate the head of a screw 30 by which the plate is connected to the drill shaft as by causing the plate 10 to bear against a rubber bushing 34 seated on a retainer washer 36 carried on the arbor 16. Moreover, to provide that none of the head of screw 30 will be exposed below the plate 10, the portion of the plate 10 surrounding the opening 28 is desirably oppositely dished or recessed, such as by a dimple as at 38.

As shown, a protective guard or shield 40 is desirably provided, but it should be noted that the guard desirably is wholly above the plane of the cutting plate 10. This permits a full cutting swath, for it is the crowned configuration of the cutting plate which prevents its teeth from gouging the ground in use. The guard 40 may be secured to the drill in any desired manner, such as by screws 42 which pass through legs 44 of the guard 40 and into holes provided in the casing of the drill.

It will thus be seen from the foregoing description of my invention according to a preferred embodiment, considered in conjunction with the accompanying drawing, that the present invention provides a new and improved device for use in the trimming or edging of the lawn. The device is of light weight, of simple and economical construction, easily formed from sheet steel, and readily attachable to a conventional electric drill. It is easy to use and efficient in its operation. It has its advantages and characteristics and accomplishes its intended objects, including those hereinbefore pointed out and others which are inherent in the invention as described.

It will be understood that modifications and variations may be effected without departing from the scope of the novel concepts of the present invention.

I claim as my invention:

1. A cutting blade structure for a power driven grass-cutting tool comprising a circular one piece dished cutter embodying an inner concave surface and an outer convex surface, said cutter having a series of integral separate teeth disposed around the periphery thereof, certain of the teeth of the series being in a plane of the body of the cutter embodying the continuous peripheral edge thereof, certain of said teeth being offset with respect to the body of said cutter and disposed at right angles to a plane passing through the transverse central portion of the body of said cutter, and mounting means integrally and centrally located upon the concave side of said cutter.

2. A cutting blade structure for a power driven grass-cutting tool comprising a circular one piece dished cutter embodying an inner concave surface and an outer convex surface, said cutter having adjacent its periphery a circumferential series of separate rectangular shaped cutting teeth, certain of said teeth being in a plane passing outwardly from and including the peripheral edge portion of the cutter, certain of the teeth being disposed in a plane at right angles to a plane passing through the transverse central portion of the body of said cutter, the leading edges of said teeth being beveled to form cutting edges, and integral means centrally located upon the concave side of said cutter for mounting said cutter with a power driven means.

3. A grass-trimming blade adapted to be attached to a rotatable shaft, comprising a one piece dished circular cutter, embodying an inner concave surface and an outer convex surface, said cutter having a series of rectangular shaped grass-cutting teeth extending from the periphery thereof, certain of said teeth of the series extending radially from the peripheral edge portion thereof, certain of said teeth of the series extending parallel to the axis of rotation of said cutter, and integral means centrally located on the inner concave surface of said cutter for mounting it upon a rotatable shaft.

4. A rotary cutting blade structure for a lawn-trimming device, comprising a circular one piece sheet metal dished cutter embodying a concave inner surface and a convex outer surface, the periphery of said cutter provided with a series of separate teeth extending outwardly from the axis of rotation thereof, a first group of alternate teeth of said series extending parallel with the axis of rotation of the cutter, alternate teeth of said series in between said first group of teeth extending radially from the axis of rotation of said cutter, and mounting means centrally located and embodied with said concave surface of the cutter.

5. A portable hand supported grass-cutting tool, comprising a handle support, an electric motor secured to said support with its armature shaft disposed vertically downward, a drive shaft assembled with said armature shaft and extending therefrom vertically downwards, a circular one piece rotary horizontally disposed upwardly dished cutter demountably secured to the lower end of said drive shaft, said cutter having a series of separate teeth around the periphery thereof, certain of the teeth of the series being in a plane of the body of the cutter adjacent the peripheral edge thereof, certain of said teeth being bodily offset with respect to the body of said cutter and disposed parallel with the axis of said vertical drive shaft, the cutting edges of said teeth being beveled on the leading edges thereof to provide means whereby the cutting edge thereof has effective engagement with the grass to be cut and the bottom of said dished circular cutter being smooth and disposed to slide along the ground when contacted therewith.

6. A portable hand supported grass-cutting tool, comprising a handle support, an electric motor secured to said support with its armature shaft disposed vertically downward, a drive shaft assembled with said armature shaft and extending therefrom vertically downwards, a circular one piece rotary horizontally disposed upwardly dished cutter demountably secured to the lower end of said drive shaft, said cutter having a series of separate rectangular shaped teeth around the periphery thereof, certain of the teeth of the series being in a plane of the body of the cutter adjacent the peripheral edge thereof, certain of said teeth being bodily offset with respect to the body of said cutter and disposed parallel with the axis of said vertical drive shaft, and the cutting edges of said teeth being beveled on the leading edges thereof to provide means whereby the cutting edge thereof has effective engagement with the grass to be cut.

7. A portable hand supported grass-cutting tool, comprising a handle support, an electric motor secured to said support with its armature shaft disposed vertically downward, a drive shaft assembled with said armature shaft and extending therefrom vertically downwards, a circular one piece rotary horizontally disposed upwardly dished cutter demountably secured to the lower end of said drive shaft, said cutter having a series of separate teeth around the periphery thereof, certain of the teeth of the series being in a plane of the body of the cutter adjacent the peripheral edge thereof, certain of said teeth being bodily offset with respect to the body of said cutter and disposed parallel with the axis of rotation of said cutter, the cutting edges of said teeth being beveled on the leading edges thereof to provide means whereby the cutting edges thereof have effective engagement with the grass to be cut, the bottom of said dished circular cutter disposed to slide along the ground when contacted therewith, means centrally located upon the inner surface of said cutter for mounting it upon the free end of said drive shaft, and a circular guard secured to the housing of said electric motor and disposed between said motor and said cutter to prevent accidental access to the top of said cutter.

8. A portable hand supported grass-cutting tool, comprising a handle support, an electric motor secured to said support with its armature shaft disposed vertically downward, a drive shaft assembled with said armature shaft and extending therefrom vertically downwards, a circular one piece rotary horizontally disposed upwardly dished cutter demountably secured to the lower end of said drive shaft, said cutter having a concave inner surface and a convex smooth outer surface, a series of separate teeth around the periphery thereof, certain of the teeth of the series being in a plane of the body of the cutter adjacent the peripheral edge thereof, certain of said teeth being bodily offset with respect to the body of said cutter and disposed parallel with the axis of rotation of said cutter, the cutting edges of said teeth being beveled on the leading edges thereof to provide means whereby the cutting edges thereof have effective engagement with the grass to be cut, the convex outer surface of said dished circular cutter disposed to slide along the ground when contacted therewith, integral means centrally located upon the concave inner surface of said cutter for mounting said cutter upon the free end of said drive shaft, and a circular guard secured to the housing of said electric motor and disposed between said motor and said cutter to prevent accidental access to the top side of said cutter.

References Cited in the file of this patent

UNITED STATES PATENTS

| | | |
|---|---|---|
| 578,250 | Holland-Letz | Mar. 2, 1897 |
| 777,396 | Buchtel et al. | Dec. 13, 1904 |
| 2,213,057 | Waller | Aug. 20, 1940 |
| 2,312,569 | Maga | Mar. 2, 1943 |
| 2,539,934 | Smith et al. | Jan. 30, 1951 |
| 2,571,455 | Keiper | Oct. 16, 1951 |
| 2,576,884 | Leigh | Nov. 27, 1951 |
| 2,598,091 | Ahlgrim | May 27, 1952 |
| 2,651,159 | Rountree, Sr. | Sept. 8, 1953 |
| 2,706,441 | Caldwell et al. | Apr. 19, 1955 |
| 2,764,865 | Pollard | Oct. 2, 1956 |